US009139892B2

(12) United States Patent
Short (10) Patent No.: US 9,139,892 B2
(45) Date of Patent: Sep. 22, 2015

(54) PROCESS FOR MAGNESIUM PRODUCTION (75) Inventor: Stephen A. Short, Mount Ousley (AU)

(73) Assignees: ECOENGINEERS PTY LTD. (AU); MAGNESIUM INVESTMENTS (AU)

(*) Notice: Subject to any disclaimer, the term of this patent is extended or adjusted under 35 U.S.C. 154(b) by 264 days.

(21) Appl. No.: 13/818,788

(22) PCT Filed: Aug. 25, 2011

(86) PCT No.: PCT/AU2011/001130
§ 371 (c)(1),
(2), (4) Date: May 2, 2013

(87) PCT Pub. No.: WO2012/024746
PCT Pub. Date: Mar. 1, 2012

(65) Prior Publication Data
US 2014/0041485 A1 Feb. 13, 2014

(30) Foreign Application Priority Data

Aug. 27, 2010 (AU) ................. 2010903855

(51) Int. Cl.
C22B 7/02 (2006.01)
C22B 7/04 (2006.01)
C22B 26/22 (2006.01)
C22B 7/00 (2006.01)

(52) U.S. Cl.
CPC .............. *C22B 26/22* (2013.01); *C22B 7/006* (2013.01); *C22B 7/007* (2013.01); *C22B 7/008* (2013.01); *C22B 7/02* (2013.01); *C22B 7/04* (2013.01)

(58) Field of Classification Search
CPC ............ C22B 7/02; C22B 7/04; C22B 7/006; C22B 7/007; C22B 7/008
See application file for complete search history.

(56) References Cited

U.S. PATENT DOCUMENTS

| 3,516,785 | A | | 6/1970 | Smith |
| 4,055,400 | A | | 10/1977 | Stambaugh et al. |
| 4,121,945 | A | | 10/1978 | Hurst et al. |
| 4,533,387 | A | * | 8/1985 | Holland et al. ......... 75/590 |
| 6,409,980 | B1 | * | 6/2002 | White et al. ......... 423/155 |

FOREIGN PATENT DOCUMENTS

| CN | 101 328 537 A | 12/2008 |
| EP | 0 201 220 A2 | 11/1986 |
| JP | 2005-230655 A | 9/2005 |

(Continued)

OTHER PUBLICATIONS

Hui-Li Lu et. al."Study on Preparation of High-Purity Magnesium Oxides from Ferric Tailings," Scientific Monograph, vol. 30, No. 4, Apr. 2007.
International Search Report for PCT International Application No. PCT/AU2011/001130, dated Oct. 21, 2011.

(Continued)

*Primary Examiner* — George Wyszomierski
*Assistant Examiner* — Tima M McGuthry Banks
(74) *Attorney, Agent, or Firm* — J.A. Lindeman & Co., PLLC (57) ABSTRACT The invention relates to a process for conditioning material for pyrometallurgical conversion to magnesium, the process comprising carrying out de-sulfation of the material in a slurry to reduce sulfur content of the material; and carrying out de-ferration of the de-sulfated material in a slurry to reduce iron content of the material to produce a conditioned material suitable for pyrometallurgical conversion to magnesium.

38 Claims, 1 Drawing Sheet

(56) References Cited

FOREIGN PATENT DOCUMENTS

| | | |
|---|---|---|
| WO | 97/16230 A1 | 5/1997 |
| WO | 2012/024746 A1 | 3/2012 |

OTHER PUBLICATIONS

Supplementary European Search Report for EP 11 81 9208.7 dated May 27, 2015.

English-language Abstract of CN 101 328 537 A, Dec. 24, 2008.

* cited by examiner

PROCESS FOR MAGNESIUM PRODUCTION

TECHNICAL FIELD

The present invention generally relates to hydrometallurgical processes for magnesium production by beneficiating a raw material to prepare a feedstock suitable for reductive pyrometallurgical conversion to magnesium.

BACKGROUND

Magnesium is a useful and valuable metal and is commonly used in aluminium alloys, in die-casting (alloyed with zinc), to remove sulfur in the production of iron and steel, and in the production of titanium. Magnesium is used in several high volume part manufacturing applications, including automotive and machine components. Because of its low weight, good mechanical and electrical properties, magnesium is widely used for manufacturing of mobile phones, laptop computers, cameras, and other electronic components.

Most of the world supply of magnesium comes from processing naturally occurring materials such as dolomite and magnesite. Another potential source of magnesium is waste ash material from coal fired power stations burning brown coals.

There are several brown coal deposits around the world. Some of the larger deposits of brown coal, also referred to as lignite, are found in Russia, the United States Germany, Poland and Australia.

The brown coal is typically prepared as a pulverized fine powder (PF) in which form it is delivered to vertical water wall boilers where it is combusted to release heat for steam generation by turbines. The majority of the combustion products are fine particles which are carried by the flue gases out of the boiler and are known as fly ash. The coarser ash particles, principally sand, settle to the bottom of the boiler from where they are collected. This fraction is known as bottom ash and generally constitutes about 20% of the total ash content of the combusted coal. The flue gases from the boiler are often treated with an electrostatic precipitator to remove the fine particles (>99%) and this fraction is known as electrostatic precipitator (EP) fly ash and comprises about 80% of the total ash content of the combusted coal. The fly ash typically contains about 5-20% char (unburnt or partially carbonised coal).

The two ash types are typically mixed with recycled ash pond water and temporarily held in a large ash pit within the power station where some chemical reactions and hydrochemical alterations to the ash begin to occur. The mixed ash slurry, with a liquid to solid ratio typically ranging from about 100:1 down to 10:1, depending on the particular power station, is then pumped to an ash pond for disposal.

Emplaced ash typically continues to 'age', i.e. undergoes further chemical alterations, including most notably hydration and decomposition of brownmillerite (calcium aluminoferrite) $Ca_2(Al,Fe)_2O_5$ to a variety of products such as hydrated calcium alumino-ferrites, hematite, iron hydrotalcites, hematite and magnetite and absorption of carbon dioxide ($CO_2$) from the atmosphere which may markedly increase the chemically fixed $CO_2$ content of the emplaced mixed ash. The $CO_2$ content of raw dry EP fly ash is relatively low, typically <1.0% but with ageing in a wet or dry ash emplacement the emplaced mixed ash $CO_2$ content slowly increases, with the $CO_2$ being largely fixed as calcite (calcium carbonate; $CaCO_3$) and magnesite (magnesium carbonate; $MgCO_3$).

The ash from brown coals has a wide variety of applications including soil conditioning/fertilization, as an extender in cement and concrete production and as fillers in non-metallic minerals and building materials. The relatively high magnesium and calcium contents in brown coals results in the brown coal fly ash being classified as 'Class C' fly ash in the American classification system and this also raises the possibility of recovering magnesium (Mg) from the fly ash.

One of the principal methods of manufacture of magnesium metal from suitable feedstock is the pyrometallurgical method known as the Pidgeon Process.

Most raw materials collected from brown coal power generation ash pits or ponds do not have suitable compositional qualities for direct conversion to magnesium using the Pidgeon Process, Failure to treat such raw material, as well as other raw material having similar composition, to achieve compositional qualities suited to the Pidgeon Process or other suitable reductive pyrometallurgical process may inhibit or prevent magnesium formation. Furthermore, magnesium generated from the raw starting material may have multiple impurities rendering it unfit for commercial use or sale.

Furthermore, the calcining stage typically used in the Pidgeon Process to convert dolomite-type feedstock into dame-type form for generation of magnesium requires significant temperatures, which can be energy and cost inefficient.

The present inventor has developed a process particularly suitable for processing fly ash and other materials for reductive pyrometallurgical magnesium production by the Pidgeon Process or other suitable reductive pyrometallurgical processes.

SUMMARY OF THE INVENTION

There are a number of potential sources of magnesium but many of these sources contain contaminating materials that prevent their use for reductive pyrometallurgical magnesium production. For example, numerous contaminants present in waste fly ash resultant from burning of brown coal to generate power prevent that material from being suitable feedstock to obtain magnesium from a reductive pyrometallurgical process such as the Pidgeon Process. If these contaminants could be removed or reduced, then it is possible to produce magnesium from these materials.

In a first aspect, the present invention provides a process for conditioning material containing magnesium for pyrometallurgical conversion to magnesium, the process comprising:

carrying out de-sulfation of the material in a slurry to reduce sulfur content of the material; and carrying out de-ferration of the de-sulfated material in a slurry to reduce iron content of the material to produce a conditioned material suitable for pyrometallurgical conversion to magnesium.

The material containing magnesium may be ashes derived from brown coal or lignite being in the form of raw dry fly ash, dry emplaced ash, stored or aged dry ash, wet emplaced ash, stored or aged wet ash, raw dry or aged dry or wet slags derived from metallurgical production of iron, steel or other ferrous metals, blast furnace slags and dusts, basic oxygen furnace slags and dusts, electric arc furnace slags, dusts and sludges, dolomite, dolime, limestone, any material having a realisable MgO and CaO content, and any and all mixtures thereof.

Preferably, the material containing magnesium is a fly ash, preferably fly ash from a brown coal power station.

Preferably, the material has a realisable magnesium oxide (MgO) and calcium oxide (CaO) content. In a preferred form, the raw material has a CaO:MgO mass ratio of greater than about 1.54.

Preferably, the slurry of up to about 30% (w/v) material in water. In a preferred form, the slurry is at least 1% (w/v) and up to about 20% (w/v) material in water.

In a preferred form, de-sulfation is carried out using a carbonation agent. Preferably, the carbonation agent is a combination of both a strong alkali cation and carbon dioxide. Preferably, the strong alkali cation is sodium, potassium or ammonium.

The strong alkali drives the formation of ion pairs between the cation of an alkali such as sodium and ammonium and sulfate to optimize solubility of sulfate-containing species and therefore to maximize the leaching (removal) of sulfur from the material. The strong alkali also drives the solubility of silicon and aluminium-containing minerals to assist leaching (removal) of silicon and aluminium from the material.

The strong alkali may be caustic soda (NaOH), caustic potash (KOH), soda ash ($Na_2CO_3$), potash ($K_2CO_3$) or ammonia ($NH_4OH$) or any combination of these. In a preferred process, the alkali is soda ash ($Na_2CO_3$).

The carbon dioxide drives the formation of calcium carbonate thereby reducing the available amount of calcium in solution therefore also maximizing the solubility of sulfate as salts of sodium, potassium and/or ammonium.

Preferably, the process is carried on the site of a brown coal power station where the material can be directly sourced.

The carbon dioxide is preferably sourced from the emission stack of a power station.

The sulfur-containing species in the feed material containing magnesium can be anhydrite ($CaSO_4$), bassanite ($CaSO_4$: $0.5H_2O$), ettringite ($Ca_6Al_2(SO_4)_3(OH)_{12}:26H_2O$), burkeite ($Na_2CO_3(SO_4)_2$), pyrrhotite (FeS), etc.

The carbonation also has the secondary purposes of accelerating the decomposition of the mineral brownmillerite (nominally $Ca_2AlFeO_5$) in the fly ash, thereby releasing more calcium for precipitation as calcium carbonate and releasing iron as hematite and amorphous iron hydroxide.

De-sulfation can be carried at an elevated temperature. The present inventor has found that an elevated temperature of about 60° C. to 75° C. is suitable but other temperatures can be used such as ambient to about 100° C. Depending on the material, temperatures above about 75° C. can have the potential to produce iron hydrotalcite, which is amorphous or fine grained, of low density and resists physical separation on the basis of density.

Preferably, the sulfur content is reduced to less than about 0.5% on a calcined basis. More preferably, the sulfur content is reduced to about 0.2% on a calcined basis.

Preferably de-ferration is a combination of a prior physical separation of bulk iron-containing minerals on the basis of density and/or magnetic susceptibility followed by a later chemical treatment step involving the use of a complexing agent for leaching iron, aluminium and silicon.

Preferably the physical separation of bulk iron-containing minerals is based on a density separation using a cyclone multi-gravity separator such as a Mozley Multi-Gravity Separator (MGS) or similar device. Preferably the physical separation of bulk iron-containing minerals uses a slurry in the 10% (w/v) to 30% (w/v) range.

Preferably, the complexing agent used in for chemical leaching of the de-ferration step is an alkanolamine, more preferably an alkanolamine selected from one or more of triethanolamine ($C_8H_{15}NO_3$), monoethanolamine ($C_2H_7NO$), diethanolamine ($C_4H_{11}NO_2$), methyldiethanolamine ($C_5H_{13}NO_2$), tri-isopropanolamine ($C_9H_{21}NO_3$), or any combination thereof.

In a preferred process, the complexing agent is triethanolamine (abbreviated TEOA) typically either of 100% chemical quality or of 85% industrial quality with diethanolamine (abbreviated DEOA) and/or monoethanolamine (abbreviated MEOA) comprising the remaining 15%.

Preferably, the triethanolamine is used at a concentration of about 1.0 molar to 3.0 molar, preferably about 2.0 molar.

A secondary organic complexing agent may also be used in process. Preferably, the organic complexing agent is selected from one or more of the common glycols (diols) ethylene glycol ($C_2H_6O_4$; abbreviated EG), propylene glycol (1,2-propanediol; 1,3-propanediol ($C_3H_8O_2$) or 1,3-butanediol ($C_4H_{10}O_2$), or from the common polyols (polyalcohols) especially having at least 2 adjacent OH groups with the middle two in the threo position, such as threitol ($C_4H_{10}O_4$), mannitol, sorbitol and xylitol.

In a preferred embodiment, the secondary organic complexing agent is ethylene glycol (EG). In a preferred process, the secondary organic complexing agent is ethylene glycol (EG) present at concentrations of 1.0 to 3.0 molar, preferably 2.0 molar.

The complexing agent(s) reacts with iron, aluminium and silicon under alkaline conditions to form water-soluble complexes, such as organo-silicates, silatranes, ferratranes and alumatranes to enable the leaching of iron, aluminium and silicon from the material.

The complexing agent(s) may be regenerated for reuse. The complexing agent maybe regenerated by neutralisation of the spent de-ferration leach liquor with carbon dioxide or hydrochloric acid and subsequent evaporation of bulk water to separate waste solids from the complexing agent. The complexing agent maybe regenerated for reuse by simultaneous neutralisation and evaporation of bulk water by treating spent de-ferration leach liquor with a hot source of carbon dioxide.

Preferably, the iron content is reduced to less than about 12% on a calcined basis. More preferably, the iron content is reduced to about 4% on a calcined basis.

Chemical de-ferration can be carried at an elevated temperature of up to about 100° C. The present inventor has found that an elevated temperature of about 75° C. is suitable but other lower temperatures can be used such as 40° C.-75° C. Depending on the material, temperatures above about 75° C. can have the potential to produce iron hydrotalcite, which resists dissolution by complexation of iron in a chemical leach 'de-ferration' stage.

In a second aspect, the present invention provides a process for producing magnesium comprising:
carrying out the process according to the first aspect of the present invention to obtain a conditioned material containing magnesium; and
carrying out a pyrometallurgical process on the cconditioned material to obtain magnesium metal.

Preferably, the pyrometallurgical process is the Pidgeon Process. It will be appreciated that other reductive pyrometallurgical processes may be used for production of magnesium from the conditioned material.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention.

In order that the present invention may be more clearly understood, preferred embodiments will be described with reference to the following drawings and examples.

MODE(S) FOR CARRYING OUT THE INVENTION

Material

The material containing magnesium may be ashes derived from brown coal or lignite being in the form of raw dry fly ash, dry emplaced ash, stored or aged dry ash, wet emplaced ash, stored or aged wet ash, raw dry or aged dry or wet slags derived from metallurgical production of iron, steel or other ferrous metals, blast furnace slags and dusts, basic oxygen furnace slags and dusts, electric arc furnace slags, dusts and sludges, dolomite, dolime, limestone, any material having a realisable MgO and CaO content, and any and all mixtures thereof.

In this invention fly ash is taken to generically mean the product, obtained by combustion in air or oxygen, in a furnace, of brown coal, also known as lignite. Fly ash is typically the ash having the finer particle size range which is exhausted from a furnace with the hot exhaust gases. Such ash is typically captured for disposal in electrostatic precipitators (EP) or fabric filter 'baghouses'.

Fly ash from a brown coal power station contains up to about 14% sulfur and up to about 17% iron on a calcined basis. To recover magnesium from a source material using a pyrometallurgical conversion process such as the Pidgeon Proces, sulphur content needs to be less than about 0.5% and iron content less than about 8%. Thus, to use fly ash or orther similar materials as a source of magnesiyum for a pyrometallurgical conversion process, the material has to processed (termed conditioning or beneficiation) to significantly reduce the sulphur and iron content.

In this invention the term fly ash is not intended to exclude the use or partial inclusion of other forms of ash from lignite in particular coarser forms of ash such as that known as 'bottom ash' which has a coarser particle size range and typically falls under gravity from the bottom of a furnace.

Pidgeon Process

Magnesium is produced from any suitable feedstock by a pyrometallurgical conversion process. The Pidgeon Process is the most commonly used pyrometallurgical conversion process and is typically carried-out is a batch-wise thermal reduction process using Ferrosilicon (FeSi) to reduce magnesium from Dolime (a mixture of calcium and magnesium oxides; CaO+MgO) at high temperature. It is a simple and well understood process throughout the global magnesium industry. The raw material source of magnesium ions for the process is usually dolomite ($CaMg(CO_3)_2$), which is typically transported from a nearby mine to a Pigeon Process Plant where it is firstly crushed, cleaned and calcined at a temperature around 1300° C. to produce Dolime via the following reaction:

$$CaMg(CO_3)_2(solid)+Heat \rightarrow CaO+MgO+2CO_2(gas)$$

where $CaMg(CO_3)_2$ is dolomite
CaO is Calcium Oxide
MgO is Magnesium Oxide
$CO_2$ is Carbon Dioxide Calcining typically takes place in either vertical (batch) retorts or rotary (continuous) furnaces depending on the scale of the operation, the quality of the dolomite and the source of the energy used e.g. coal or natural gas.

Next, the two major feeds into the Pidgeon reduction process proper, Dolime and FeSi, are typically finely ground, mixed to a specific ratio, sometimes with inclusion of a calcium fluoride ($CaF_2$) flux, pelletised and then fed into a steel, horizontal cylindrical reaction chamber, known as a retort. The feed end of the retort is typically eater cooled and protrudes from the reduction furnace. Typical dimensions for a retort are of the order of 250-300 m internal diameter and approximately 3000 mm in length.

The retorts are heated in refractory brick furnaces, in banks, to a temperature of around 1200° C. under a strong vacuum (approximately 10-15 mm Hg), whereby the following reduction reaction proceeds to produce magnesium vapour:

$$2(CaO+MgO)(solid)+FeSi(solid) \rightarrow 2Mg(vapour)+ ((CaO)_2SiO_2)Fe(solid)$$

where $(CaO)_2SiO_2Fe$ is calcium ferrosilicate.

The magnesium vapour typically condenses in crystalline form at the water-cooled end of the retort, on a recyclable steel sleeve. The condensate is known as a 'crown' and, typically, the crown produced in each retort weighs between 18 and 22 kg per processed batch charge, depending on the charge size and the particular reaction conditions.

A wide range of furnace designs exist, with the number of retorts per furnace typically ranging from 10 to 30. Around 9 hours are required for the basic reaction to occur plus an additional 2-3 hours for retort emptying, cleaning and refilling. Most retorts are therefore typically operated on 12-hour cycle.

Once cooled, the crowns are typically collected and transported to a nearby casting plant, remelted and cast as pure ingots. There is a growing tendency for the metal to be alloyed during the melting and casting process.

The Pidgeon Process typically requires the following composition qualities:

MgO content is preferably >20% for a Dolomite-type feedstock (i.e. $CaMg(CO_3)_2$) to the calcining stage or preferably >38% for a Dolime-type feedstock (i.e. CaO+MgO) to the final retorting stage.

CaO content is preferably >30% for a Dolomite-type feedstock to the calcining stage or preferably >57% for a Dolime-type feedstock to the final retorting stage.

The mass ratio of CaO/MgO for both stages is preferably >1.54 (unless supplementary additions of pure MgO or CaO are made just before the retorting stage).

The sum of the alkali metal oxides, potassium and sodium oxide i.e. $K_2O+Na_2O$ is preferably <0.05% for the calcining stage or preferably <0.10% for the final retorting stage, otherwise higher levels may lead to excessive melt loss and the elemental K and Na formed will report to the magnesium crown and burn on contact with air, causing the magnesium to burn as well.

Silica or $SiO_2$ is preferably <1.0% entering the calcining stage or preferably <2.0% for the final retorting stage, otherwise higher levels may interfere with the high temperature reduction reaction by forming a glass layer which may interfere with the reaction in the retort.

Total sulfur (S) is preferably <0.5% for the final retorting stage, otherwise sulfides and polysulfides may be formed by reduction of sulfate, and these may react with the elemental magnesium vapour (to form magnesium sulfide; MgS) as it is formed.

Iron, expressed as $Fe_2O_3$, is preferably <4.0%, as a greater percentage may place an excessive non-productive reduction burden on the FeSi reductant and may cause significant problems with slag reactions within the retort.

Aluminium, expressed as $Al_2O_3$, is preferably <1.5% for the calcining stage or preferably <2.8% for the retorting stage, as greater percentages may cause significant problems with slag reactions within the retort.

The above compositional qualities for the feedstock to the final retorting stage of the Pidgeon Process represent preferable compositional qualities for a dolomite $(CaMg(CO_3)_2)$ feedstock to the calcining stage and/or for a dolime feedstock to the final retorting stage.

While some raw material collected from brown coal power generation ash pits or ponds already has suitable compositional qualities for conversion to magnesium using the Pidgeon Process, this is very uncommon. Failure to treat such raw material, as well as any other raw material having similar composition, to achieve compositional qualities suited to the Pidgeon Process may inhibit or prevent magnesium formation or magnesium generated from the raw material starting material may have multiple impurities rendering it unfit for commercial use or sale.

Results

Research and development for this process was conducted with raw dry electrostatic precipitator (EP) fly ash sourced from Victorian brown coal combusted at the Hazelwood Power Station in the Latrobe Valley, Victoria, Australia.

The coal being combusted at the time of generation of this fly ash would have been sourced from the West Field coalfield. Well-mixed, this raw EP fly ash was found to contain about 5.5% organic carbon (char).

Table 1 compares the analysis of this fly ash used for the research and development of this process, corrected to be on a residual combustibles-free basis not including any chloride (Cl) or carbon dioxide ($CO_2$) content, compared with published typical total ash analyses for other open cut brown coals mined for power generation in the Latrobe Valley.

TABLE 1

| Ash Composition Analyses | Yallourn Seam Y | Morwell Seam M1 | Yallourn North Extension Seam M2 | Loy Yang Seam M1B | Loy Yang Seam M2 | Hazelwood EP fly ash |
|---|---|---|---|---|---|---|
| $SiO_2$ | 26.9 | 16.4 | 8.6 | 17.2 | 45.5 | 9.5 |
| $Al_2O_3$ | 8.6 | 3.4 | 5.0 | 12.4 | 8.5 | 2.7 |
| $Fe_2O_3$ | 20.0 | 9.3 | 19.8 | 11.5 | 17.4 | 11.5 |
| $TiO_2$ | 0.5 | 0.3 | 0.6 | 0.0 | 0.0 | 0.2 |
| CaO | 6.0 | 24.7 | 25.1 | 3.0 | 4.8 | 27.0 |
| MgO | 14.3 | 14.2 | 8.6 | 11.6 | 6.6 | 16.7 |
| $Na_2O$ | 6.5 | 4.9 | 3.5 | 17.4 | 4.6 | 7.8 |
| $K_2O$ | 0.3 | 0.3 | 0.2 | 0.0 | 0.0 | 0.7 |
| $SO_3$ | 17.1 | 26.6 | 28.6 | 26.9 | 12.7 | 23.7 |

The composition of Hazelwood EP fly ash is, in some senses, similar to that of fly ash obtained from other Latrobe valley power stations. For example, the MgO and CaO contents of Hazelwood EP fly ash are not significantly superior to the Morwell Seam M1 and Yallourn North Extension Seam M2 mixed coal ash.

Furthermore the Hazelwood EP fly ash contains a comparable amount to other Latrobe Valley fly ashes of the most critical contaminant with respect to any process for preparing a viable feedstock for reductive pyrometallurgical production of magnesium namely, the sulfur (as $SO_3$) content.

It has been observed in the field of reactive chemical hydrometallurgy using solids that the rate of reactions and optimization of their approach to equilibrium chemothermodynamics is achieved by reactions between chemicals in solution and solid particles of the smallest achievable particle size. Mineral species retained in larger particle sizes are less reactive due to reduced surface area and, in some cases, greater hardness.

It is known from optical microscopy and particle sizing studies conducted during development of this process that the coarser particles in brown coal ashes are dominated by coarse silica (sand) and unburnt 'char'.

These physical tests and associated calculations showed that it was likely that the major part of the silica ($SiO_2$) content, which is generally required to be removed for pyrometallurgical production of magnesium by the Pidgeon Process, could be removed by wet screening to exclude all coarse particles from subsequent hydrometallurgical process steps.

The other reason why this hydrometallurgical process is based on an alkali such as soda ash, caustic soda or ammonia in the presence of dissolved carbon dioxide and/or bicarbonate and/or carbonate species in the first chemical stage is that this maximises the leaching of the most critical contaminant in the ash, being sulfur (S) from the material, preferably through maximisation of the dissolution of the minerals gypsum ($CaSO_4:2H_2O$) and anhydrite ($CaSO_4$) which are the principal loci of sulfur, and of thenardite ($Na_2SO_4$), ettringite ($Ca_6Al_2(SO_4)_3(OH)_{12}:26H_2O$), ettringite-Fe ($Ca_6Fe_2(SO_4)_3(OH)_{12}:26H_2O$) and pyrrhotite (FeS) which are the minor loci of sulfur. This was achieved through maximising the solution concentration of sulfate ($SO_4$) by Minimising the solution concentration of calcium and maximisation of the concentration in the solution of negatively charged sodium, potassium or ammonium ion pairs with sulfate, which ion pairing increases the net solubility of sulfate in the presence of low levels of calcium.

It is common in hydrometallurgical science to attempt to derive a thermodynamic model of the individual unit processes which comprise the overall hydrometallurgical process. In the first instance, such models usually assume that each unit process is operated in such a way that full chemical equilibrium is attained. In practice this may not occur for a variety of chemical and physical reasons but close attainment of equilibrium in each unit process is generally aimed for on the basis that it optimizes its reliability and predictability.

The primary basis for guiding further research and development of this process was therefore the writing of a comprehensive equilibrium chemothermodynamic model of the hydrometallurgical sequence of the process. Two thermodynamic databases which are suitable for the weakly to strongly alkaline, siliceous, ferruginous and aluminous systems of fly ashes, slags, dolomites and magnesites are; THERMODDEM released 26 Feb. 2008, originating from BRGM, the French Geological Survey, and CEMDATA.7.2 released 14 Aug. 2008, originating from ETH, the Swiss Institute of Technology. These databases are available in forms which are compatible with the United States Geological Survey open source chemothermodynamic model PHREEQC version 2.15 used in the conception and design of this process.

PHREEQC is a model which is suitable for modelling aqueous systems up to a maximum ionic strength of approximately 1.0 molar or 1.0 molal due to the fact that the method it uses to compute aqueous species activity coefficients is only valid to approximately that level.

Literature research and preliminary manual calculations showed that the preferred reagent to solubilize and keep in solution the other major unwanted contaminants other than sulfur, namely iron (Fe), aluminium (Al) and silicon (Si) would be triethanolamine (abbreviated TEOA) or a similar alkanolamine, due to the propensity of this chemical to complex-with and hence solubilise these metals in moderately to highly alkaline solutions, possibly supplemented if need be with a second complexing reagent to 'fine tune' their solubilities.

The literature on the stability of metal-triethanolamine complexes is not extensive and some lacks currency such that the reliability of the stoichiometry of the solution complexes and their formation constants is not high and are not known with sufficient precision to provide reliability to the chemo-thermodynamic modelling.

The type and stability of iron, aluminium and silicon aqueous solution triethanolamine (TEOA) complexes were therefore estimated using a combination of data available in the literature, use of the Unified Theory of Metal-ion Complexation (UTMIC) of Brown and Sylva and linear free energy correlations. The results obtained appeared to be consistent with the experimental information available in the literature, both in terms of solubility experiments and determined stability constants and broadly accorded with the observations made during bench scale development of the fly ash beneficiation process.

Beneficiation Process

A series of steps for the process of converting a raw material, such as raw fly ash, aged ash recovered from an ash emplacement, or a slag or dolomitic material, into a suitable form for reductive pyrometallurgical conversion to magnesium was formulated using the results of the above-described research and development activities and assessments.

According to some preferred embodiments, the process steps are as follows:

The raw material can be converted to a slurry formed by mixing at an ambient temperature above about 20° C. under high shear conditions to disperse agglomerate particles. By high shear conditions is meant any method of mixing designed to abrade and reduce the particle size of the suspended solid material. Typically, the slurry is about 1 to 20% w/v where the quantity of solid raw material is about 1 units by weight up to about 20 units by weight and about 100 units by weight of water. Preferably the initial starting slurry is about 1% w/v.

It will be appreciated that any suitable means may be used to form a slurry. For example, the raw material may initially be provided already in a wet form having the preferred conditions in an equivalent slurry of 1:100 to 20:100 solid:water ratio. This latter situation requires that the moisture content of the wet form material be known.

An alkali, which can be soda ash ($Na_2CO_3$), caustic soda (NaOH) or ammonia ($NH_3$), is added if necessary to create a slurry having a pH of at least 12 (defined as at about 25° C.). Preferably the alkali is soda ash. Preferably the soda ash addition is added in the concentration range of 0.005-0.15 molar (0.05-1.6% w/v). Preferably, the pH of the resulting slurry is between about 12 and 13 (defined as at about 25° C.).

Carbon dioxide is then blown or sparged through the solution to create a slurry having a pH between about 6.5 and 10.0 (defined as at about 25° C.). Preferably, the pH of the slurry is between about 7.0 and 9.0 (defined as at about 25° C.).

The slurry can then be wet sieved between 25° C. and 60° C. through a screen with an opening no greater than about 75-250 µm in size. The primary purpose of this wet sieving is to remove particles of coarse and hence unreactive silica (sand) and any other coarse minerals, uncombusted coal and coke, char etc. Preferably sieving is typically carried out using a screen having a mesh opening size of about 75 to 100 µm. It will be appreciated that the sieve mesh opening size can be selected to reject or retain mineral solids by their size distribution Preferably the sieve mesh opening size is selected to reject at least 50% of the total silica ($SiO_2$) content of the material and at least 50% of any char content of the material.

The slurry can then be held at any temperature and for such a duration as can be shown to remove more than about 80% of the original total sulfur content of the material. The temperature for this bulk de-sulfation may be anywhere between 20° C. and 95° C. Preferably the temperature is above 45° C. to enhance brownmillerite decomposition but less than 75° C. to avoid excessive iron hydrotalcite formation. Preferably the pH is between about 7.0 and 8.5 (defined as at about 60° C.). Preferably the duration is from 6-8 hours.

The slurry is then filtered to a damp solid and resuspended in a 5% to 20% w/v slurry with water containing 0-0.10 molar soda ash i.e. up to 1% w/v $Na_2CO_3$. Preferably the slurry is resuspended in a 10% slurry of 0.05 molar soda ash. The slurry is then heated to any such temperature as described above for such a duration as can be shown to remove at least about 75% of the remaining sulfur content of the material and to decompose the remainder of any unreacted brownmillerite. Preferably the temperature is not greater than about 75° C. to avoid excessive iron hydrotalcite production following brownmillerite decomposition. Preferably the pH should lie between 8.0 and 9.0 (defined as at about 75° C.).

The slurry may be cooled to ambient temperature and subjected to appropriate forms of physical density separation to remove heavy minerals on the basis of their higher specific gravity. The primary purpose of this separation is to remove particles of higher specific gravity in excess of 3.0 in order to produce a significant reduction in bulk iron content of the material.

The separation may be conducted using a Mozley Multi-Gravity Separator (MGS) or a similar device. It will be appreciated that the MGS Separator or a similar device can be operated to reject or retain mineral solids by reason of their specific gravity. The Mozley MGS consists of a lined drum, slightly tilted, which is rotated and also shaken. This action obtains the benefits of both a shaking table and centrifugal device. The drum angle, rotation speed, stroke frequency and stroke length are all machine adjustable parameters. Along with operating parameters such as feed rate, feed slurry and water chemistry, which affects degree of particle dispersion and clumping, the MGS provides a flexible gravity separation device for a wide range of minerals. It is particularly suited to separating the heavier iron-containing minerals such as brownmillerite, hematite, magnetite, pyrrhotite etc., which occur in fly ash. Preferably the slurry strength employed in the MOS lies between 10% and 30% w/v.

The slurry is then filtered to a damp solid and resuspended in a 10-20% w/v slurry with a leach solution comprising water containing 0.06-0.10 molar caustic soda (0.24-0.40% NaOH) or 0.15-0.35 molar ammonia (0.26-0.6% $NH_3$) and 1.5-2.5 molar of the complexing agent.

The contaminants typically removed by this leach stage are iron, aluminium and silicon. Such contaminants can be substantially removed from the slurry by leaching, requiring maintaining the slurry at 45° C.-100° C. for up to 36 hours. Preferably the temperature shall lie between 60° C. and 75° C. Preferably the pH of this leach reagent lie in the 8.5-9.5 range (defined as at about 60° C.). Preferably the leach period is at least 24 hours. It will be appreciated that the time required may vary depending on the material being processed and the amount being treated.

The complexing agent is preferably an alkanolamine, more preferably an alkanolamine selected from one or more of triethanolamine ($C_6H_{15}NO_3$), monoethanolamine ($C_2H_7NO$), diethanolamine ($C_4H_{11}NO_2$), methyldiethanolamine ($C_9H_{13}NO_2$), tri-isopropanolamine ($C_9H_{21}NO_3$), or any combination thereof.

In a preferred process, the complexing agent is triethanolamine (abbreviated TEOA) typically either of 100% chemical quality or of 85% industrial quality with diethanolamine (abbreviated DEOA) and/or monoethanolamine (abbreviated MEOA) comprising the remaining 15%.

Preferably, the secondary organic complexing agent (if used) is selected from one or more of the common glycols (diols) ethylene glycol ($C_2H_6O_4$; abbreviated EG), propylene glycol (1,2-propanediol; 1,3-propanediol ($C_3H_8O_2$) or 1,3-butanediol ($C_4H_{10}O_2$), or from the common polyols (polyalcohols) especially having at least 2 adjacent OH groups with the middle two in the threo position, such as threitol ($C_4H_{10}O_4$), mannitol, sorbitol and xylitol.

In a preferred process, the secondary organic complexing agent, if used at all, is ethylene glycol (EG) present at a concentration of up to 3.0 molar.

Iron-containing minerals are typically present as goethite (FeOOH), hematite ($Fe_2O_3$), undecomposed brownmillerite (nominally $Ca_2AlFeO_5$), amorphous iron hydroxide ($Fe(OH)_3$) and iron hydrotalcite ($Mg_4Fe_2(OH)_{14}:3H_2O$). These minerals are soluble in the leach reagent containing complexing agents with the exception of brownmillerite iron hydrotalcite.

Aluminium-containing minerals are typically present as mullite ($Al_6Si_2O_{13}$), gibbsite ($Al(OH)_3$), boehmite (AlO (OH)), ettringite-($Ca_6Al_2(SO_4)_3(OH)_{12}:26H_2O$), monosulfoaluminate ($Ca_4Al_2SO_{10}:12H_2O$), hydrotalcite ($Mg_4Al_2O_7:10H_2O$) and hydrotalcite-$CO_3$ ($Mg_4Al_2(OH)_{12}(CO_3):2H_2O$). All these minerals are soluble in the leach reagent containing complexing agents with the exception of mullite.

Silicon-containing minerals are typically present as various forms of quartz ($SiO_2$) and cristobalite ($SiO_2$). These minerals are only slightly soluble in the leach reagent containing complexing agents.

Spent leach liquor resulting from one single iron, aluminium and silicon leach may be reused up to 5-10 times for subsequent leaches by adjusting the pH at 25° C. back into the 9.5-10.5 range (defined at 25° C.) with additions (per reuse) of NaOH additions in the range 0.06-0.16 molar (0.24-0.64% w/v) or ammonia in the range 0.16-0.32 molar (0.27-0.54% w/v) for each reuse cycle prior to heating at 45° C.-105° C. and holding for a period at elevated temperature to affect leaching. Preferably the leaching temperature in each case is 60° C. and preferably the duration of each leach cycle is 24-36 hours. It will be appreciated that the time required may vary depending on the material being processed and the amount being treated.

It is expected that after 5-10 reuses (with pH adjustment per reuse cycle) of the leach liquor the efficiency of leaching of iron in particular will have declined to a low value, typically <25% of total iron present. At this point the leach liquor will need to be discarded or will require recovery and purification.

When the complexing agent is TEOA and secondary complexing agent (if used) is EG the TEOA (and EG) can be purified and recovered at least 95% by separation from completely spent leach liquor. This is accomplished by neutralization with carbon dioxide or hydrochloric acid to pH 7.0-8.0 followed by evaporation of at least 80% of the water to deposit an insoluble iron-, aluminium- and silicon-rich 'crud' comprised of nahcolite ($NaHCO_3$), iron oxides and oxyhydroxides e.g. goethite and hematite, dawsonite ($NaAlCO_3$ $(OH)_2$), diaspore (AlO(OH)), and chalcedony ($SiO_2$) or amorphous silica. ($SiO_2$).

This neutralisation and evaporation method recovers >95% of the TEOA and EG for recycling back to the iron, aluminium and silicon leach stage and on grounds of cost of complexing agents is a desirable approach. Preferably, if a hot source of carbon dioxide is available, both neutralisation and evaporation of bulk water from the spent leach liquor can be accomplished simultaneously.

The solid material resulting from a leach stage to reduce iron; aluminium and silicon contaminant levels must be thoroughly washed free of adsorbed complexing agent by suspending in boiling water for a period of 1-2 hours followed by dewatering by filtration, hydrocycloning or centrifugation.

The solid material resulting from washing of the sod material resulting from the leach stage in this manner is then suitable, after drying, as a feedstock for passing to the initial calcination stage (to remove carbon dioxide and chemically bound water) of the Pidgeon Process or the initial calcination stage of any alternative reductive pyrometallurgical method of magnesium production.

Magnesium-containing minerals in the beneficiated solid material resulting from the leach stage to reduce iron, aluminium and silicon contaminant levels are typically principally magnesite ($MgCO_3$) with lesser proportions of unreacted periclase (MgO), brucite ($Mg(OH)_2$), hydrotalcite ($Mg_4Al_2O_7:10H_2O$) and unreacted moriticellite ($CaMgSiO_4$).

The material may further comprise calcium-containing minerals. Typically, the calcium-containing minerals are principally calcite ($CaCO_3$) with a lesser proportions of the zeolite heulandite ($Ca(Al_2Si_7)O_{18}:6H_2O$).

The material may further comprise unleached iron- and aluminium-containing minerals. Typically, the non-leached iron and aluminium-containing minerals are principally brownmillerite (nominally $Ca_2AlFeO_3$), iron hydrotalcite ($Mg_4Fe_2(OH)_{14}:3H_2O$) and the zeolite heulandite ($Ca(Al_2Si_7)O_{18}:6H_2O$) which forms during the process steps.

The feedstock from the calcination is suitable for pyrometallurgical conversion to magnesium using the Pidgeon Process or any other reductive pyrometallurgical method of magnesium production, for example that based on the use of powdered metallic aluminium as the reductant.

Process Trials

A large number of bench scale process trials converting a raw EP brown coal fly ash (raw fly ash abbreviated RFA) obtained from the electrostatic precipitators of the Hazelwood Power Station in the Latrobe Valley of the state of Victoria, Australia, have been conducted during development of the process according to the present invention. The Hazelwood RFA is considered to be quite typical of a brown coal raw fly ash immediately after production.

The RFA used in these process trials had been determined by X-ray fluorescence (XRF) and X-ray powder diffraction (XRD) studies to have the mineralogical composition as set out in Table 2.

TABLE 2

| Mineral Name | Assumed mineral stoichiometry | Percentage of mineral by weight | Moles of mineral per 100 grams RFA |
| --- | --- | --- | --- |
| Periclase | MgO | 18.5 | 0.4590 |
| Brownmillerite | $Ca_2Al_{0.6}Fe_{1.4}O_5$ | 15.0 | 0.0589 |
| Anhydrite | $CaSO_4$ | 31.0 | 0.2277 |
| Calcite | $CaCO_3$ | 1.0 | 0.0100 |
| Albite | $NaAlSi_3O_3$ | 5.0 | 0.0191 |
| Halite | NaCl | 5.0 | 0.0856 |
| Quartz | $SiO_2$ | 3.0 | 0.0499 |
| Lime | CaO | 3.0 | 0.0535 |
| Cristobalite | $SiO_2$ | 1.0 | 0.0166 |
| Hematite | $Fe_2O_3$ | 3.0 | 0.0188 |
| Soda | $Na_2O$ | 1.0 | 0.0161 |
| Sodium Sulfate | $Na_2SO_4$ | 3.0 | 0.0211 |
| Pyrrhotite | FeS | 0.5 | 0.0057 |
| Inerts (char, bound water) | Not applicable | 10.0 | Not applicable |

The following two process sets as described below combine the individual unit processes described above many variants bench trialled in the laboratory into two possible process sequences, one commencing with utilisation of a 1% slurry of RFA in an alkaline waste water made up to simulate an available wastewater from the Hazelwood No 1 ash dam, the other commencing with utilisation of a 10% w/v slurry RFA in the same simulated waste water.

The simulated Hazelwood No 1 ash dam waste water had the basic composition as set out in Table 3.

TABLE 3

| pH (pH units) | Sodium (mg/L) | Potassium (mg/L) | Calcium (mg/L) | Magnesium (mg/L) | Chloride (mg/L) | Sulfate (mg/L) | Total Alkalinity (mg/L as $CaCO_3$) |
| --- | --- | --- | --- | --- | --- | --- | --- |
| 12.43 | 3224 | 287 | 770 | 0.3 | 1411 | 5348 | 1895 |

Equipment

2× tared 5 and 12 litre (L) stainless steel beakers or pots.

Mechanical high shear mixer.

pH meter e.g. TPS model WP-80D. pH probe must be of the high sodium type.

pH 10.00 and 7.00 buffers.

Electrical Conductivity meter e.g. TPS model AQUA-C.

Electrical Conductivity standard. This is preferably at least about 20 mS/cm, but more preferably, is about 50 mS/cm.

Carbon dioxide cylinder.

Anhydrous sodium carbonate ($Na_2CO_3$); solid; reagent grade; 100%; Molecular Weight (MW)=106.0

Anhydrous sodium hydroxide (NaOH); solid; reagent grade; 100%; MW=40.0

Concentrated aqueous ammonia ($NH_3$); liquid, reagent grade; 29%; MW=17.0

Triethanolamine $(CH_2CH_2OH)_3N$; liquid, reagent grade; 85%; SG @ 20° C.=1.122; MW=149.2

Initial Procedures

Calibrate pH meter/probe with pH 10.00 and 7.00 buffers.

Calibrate Electrical Conductivity (EC) meter/probe with EC standard.

EXAMPLE

Process Set #1

1: Slurry Preparation Stage a) Prepare 10.0 L of a 0.006 M $Na_2CO_3$ solution by dissolving 6.36 g anhydrous sodium carbonate ($Na_2CO_3$) in 10.0 L of actual or simulated ash dam water in a 12 L vessel.

b) Add 100.0 grams of RFA. Stir to mix well.

c) Monitor the initial slurry pH and EC (corrected to 25 C). Record the start pH and EC.

2: Wet Screening Stage a) Next, pass the whole 10 L of slurry through a vibrating 100 μm screen to remove the oversize solids and retain the undersize slurry. Spray 100 mL of the same 0.006 M $Na_2CO_3$ in actual or simulated ash dam water onto the oversize material to rinse the solids on the screen, allowing the rinse solution to pass through into the undersize slurry. Transfer the −100 μm wet sieved slurry in its entirety into a 12 L stainless steel vessel, measure and record pH and EC.

b) Weigh all the rinsed drained oversize material, dry and determine water content. Record wet and dry weights and water content.

c) Take a small, measured volumetric subsample from the weighed bulk undersize slurry, e.g. 250 mL, into a pre-weighed micro-fitter apparatus, to determine the moisture content and to provide a small sample for analysis. Weigh and then filter, washing with 100 mL 0.06 M $Na_2CO_3$ wash solution. Dry the subsample at 105° C. to constant weight to determine moisture content and record. This wet screened subsample should be labelled appropriately.

d) Arrange for analysis of the dried −75 μm solids by XRF for Total S, MgO, CaO, $Na_2O$, $K_2O$, $SiO_2$, $SrO_2$, $Al_2O_3$, $Fe_2O_3$, $Mn_3O_4$, NiO, $P_2O_5$, $TiO_2$, $C_1$, $SO_3$, Cl, Total Inorganic Carbon (TIC), Total Organic Carbon (TOC), Loss on Ignition (101) (NB: Total S is to be determined by a Leco combustion method using calcined (post-LOI) material.

3: De-sulfation Leach Stage a) Sparge $CO_2$ slowly through the slurry until a pH of 7.0 or slightly less is attained.

b) Cover the container of wet sieved slurry, and stir gently for 6 hours at ambient. Periodically monitor the pH and if it rises above 9.5 sparge additional $CO_2$ to drive the pH back below 8.5.

c) Monitor the slurry pH and EC (corrected to 25° C.) at the end of this period. Record the end pH and EC.

d) Slowly pressure filter the slurry to separate the wet solids. Avoid cracking of the filter cake.

e) Disassemble the filter unit and repulp the solid filter cake in 1.00 L of hot, almost boiling 0.05 M $Na_2CO_3$ wash solution. Stir for 30 minutes maintaining temperature at 75±5° C.

f) Slowly pressure filter the hot slurry to separate the hot wet solids. Avoid cracking of the filter cake. Rinse the filter cake in the filter unit with slow passage of another 1.00 L of hot (75±5° C.) 0.05 M $Na_2CO_3$ wash solution.

g) Take a small, measured weighed subsample from the weighed bulk wet filtered and washed leached material being (wet) not greater than 15 g, to determine moisture content and provide a sample for XRF analysis. Dry the subsample at 105° C. to constant weight to determine moisture content and record. Label this first hot leached subsample appropriately.

h) Analyse these dried, hot-leached solids for Total S, MgO, CaO, $Na_2O$, $K_2O$, $SiO_2$, $SrO_2$, $Al_2O_3$, $Fe_2O_3$, $Mn_3O_4$, NiO, $P_2O_5$, $TiO_2$, $SO_3$, Cl, TIC, TOC, and LOI. (NB: Total S is to be determined by a Leco combustion method using calcined (post-LOI) material).

4: De-ferration Chemical Leach Stage a) Take the bulk moist (washed) solid filter cake from the first hot leach stage and transfer it, with as little loss as possible, to a 3 L stainless steel container.

b) Add 1.00 L of water. Add 3.2 g solid anhydrous NaOH. Add 351 g 85% triethanolamine (=313 mL). Label as '0.08 M NaOH+2.00 M TEOA'. Stir to mix well and to thoroughly dissolve the NaOH and triethanolamine.

c) Measure and record the start pH and EC.

d) Raise the temperature to 75° C. and maintain temperature at 75±5° C. with slow stirring for 36 hours.

e) Cool and slowly pressure filter the slurry, using a pressure filter, through filter paper, collecting the filtered liquor. Avoid cracking of the filter cake.

f) Disassemble the pressure filter unit and transfer the wet filter cake into a stainless steel beaker. Add 1.00 L of water and boil gently for 20 minutes to fully disperse the fitter.

g) Slowly pressure filter the hot slurry, using a pressure filter, through filter paper. Avoid cracking of the filter cake.

h) Disassemble the pressure filter unit once again and again transfer the wet filter cake to the stainless steel beaker. Again add 1.00 L of water and again boil gently for 20 minutes to again disperse the filter cake.

i) Again slowly pressure filter the hot slurry, using a pressure filter, through filter paper, again adding this second wash solution to the combined filtered liquor and wash solution. Avoid cracking of the filter cake.

j) Disassemble the pressure filter unit and weigh the wet filtered solids. Dry the weighed bulk filtered solids at 105° C. to constant weight to determine moisture content and record. This second stage hot leached sample should be labelled appropriately.

k) Take a labelled subsample of not more than 15 g of these dried filtered solids and arrange for analysis of the dried material by XRF for Total S, MgO, CaO, $Na_2O$, $K_2O$, $SiO_2$, $SrO_2$, $Al_2O_3$, $Fe_2O_3$, $Mn_3O_4$, $TiO_2$, NiO, $P_2O_5$, $SO_3$, Cl, TIC, TOC, and LOI. (NB: Total S is to be determined by a Leco combustion method using calcined (post-LOI) material).

l) Send the remainder of the labelled, dried filtered solids to the associate consultant for calcining and pyrometallurgical testing of magnesium production efficiency.

EXAMPLE

Process Set #2

1: Slurry Preparation Stage a) Prepare 2.5 L of a 0.16 M $Na_2CO_3$ solution by dissolving 17.0 g anhydrous sodium carbonate in 2.5 L of actual or simulated ash dam water in a 5 L vessel.

b) Add 250.0 grams of RFA. Stir to mix well.

c) Monitor the initial slurry pH and EC (corrected to 25 C). Record the start pH and EC.

2: Wet Screening Stage a) Next, pass the whole 2.5 L of slurry through a vibrating 75 μm screen to remove the oversize solids and retain the undersize slurry. Spray 250 ml 0.16 M $Na_2CO_3$ onto the oversize material to rinse the solids on the screen, allowing the rinse solution to pass through into the undersize slurry. Transfer the −75 μm wet sieved slurry in its entirety into a 5 L stainless steel vessel, measure and record pH and EC. Seal this slurry until Stage 3 can be commenced.

b) Weigh all the rinsed drained oversize material, dry and determine water content. Record wet and dry weights and water content.

c) Take a small, measured volumetric subsample from the weighed bulk undersize slurry, e.g. 250 mL, into a pre-weighed micro-filter apparatus, to determine the moisture content and to provide a small sample for analysis. Weigh and then filter, washing with 100 mL 0.16 M $Na_2CO_3$ wash solution. Dry the subsample at 105° C. to constant weight to determine moisture content and record. This wet screened subsample should be labelled appropriately.

d) Arrange for analysis of the dried −100 μm solids by XRF for Total S, MgO, CaO, $Na_2O$, $K_2O$, $SiO_2$, $SrO_2$, $Al_2O_3$, $Fe_2O_3$, $Mn_3O_4$, NiO, $P_2O_5$, $TiO_2$, $C_1$, $SO_3$, Cl, Total Inorganic Carbon (TIC), Total Organic Carbon (TOC), and LOI). (NB: Total S is to be determined by a Leco combustion method using calcined (post-LOI) material).

3: De-sulfation Leach Stage a) Sparge $CO_2$ slowly through the slurry until a pH of 7.0 or slightly less is attained.

b) Cover the container of wet sieved slurry, and stir gently for 6 hours at ambient. Periodically monitor the pH and if it rises above 9.5 sparge additional $CO_2$ to drive the pH back below 8.5.

c) Monitor the slurry pH and EC (corrected to 25° C.) at the end of this period. Record the end pH and EC.

d) Slowly pressure filter the slurry to separate the wet solids. Avoid cracking of the filter cake.

e) Disassemble the filter unit and repulp the solid filter cake in 1.00 L of hot, almost boiling 0.05 M $Na_2CO_3$ intermediate wash solution. Stir for 30 minutes maintaining temperature at 75±5° C.

f) Slowly pressure filter the hot slurry to separate the hot wet solids. Avoid cracking of the filter cake. Rinse the filter cake in the filter unit with slow passage of another 1.00 L of hot (75±5° C.) 0.05 M $Na_2CO_3$ wash solution.

g) Take a small, measured weighed subsample from the weighed bulk wet filtered and washed leached material being (wet) not greater than 15 g, to determine moisture content and provide a sample for XRF analysis. Dry the subsample at 105° C. to constant weight to determine moisture content and record. Label this first hot leached subsample appropriately.

h) Arrange for analysis of these dried, hot-leached solids for Total S, MgO, CaO, $Na_2O$, $K_2O$, $SiO_2$, $SrO_2$, $Al_2O_3$, $Fe_2O_3$, $Mn_3O_4$, NiO, $P_2O_5$, $TiO_2$, $SO_3$, Cl, TIC, TOC, and LOI. (NB: Total S is to be determined by a Leco combustion method using calcined (post-LOI) material).

4: De-ferration Leach Stage a) Take the bulk moist (washed) solid filter cake from the first hot leach stage and transfer it, with as little loss as possible, to a 3 L stainless steel container.

b) Add 2.50 L of water. Add 41 mL concentrated aqueous ammonia. Add 878 g 85% triethanolamine (=782 mL). Label as '0.25 M $NH_3$+2.00 M TEOA'. Stir to mix well and to thoroughly dissolve the NaOH and triethanolamine.

c) Measure and record the start pH and EC.

d) Raise the temperature to 75° C. and maintain temperature at 75±5° C. with slow stirring for 36 hours.

e) Cool and slowly pressure filter the slurry, using a pressure filter, through filter paper, collecting the filtered liquor. Avoid cracking of the filter cake.

f) Disassemble the pressure filter unit and transfer the wet filter cake into a stainless steel beaker. Add 1.00 L of water and boil gently for 20 minutes to fully disperse the filter.

g) Slowly pressure filter the hot slurry, using a pressure filter, through filter paper. Avoid cracking of the filter cake.

h) Disassemble the pressure filter unit once again and again transfer the wet filter cake to the stainless steel beaker. Again add 1.00 L of water and again boil gently for 20 minutes to again disperse the filter cake.

i) Again slowly pressure filter the hot slurry, using a pressure filter, through filter paper, again adding this second wash solution to the combined filtered liquor and wash solution. Avoid cracking of the filter cake.

j) Disassemble the pressure filter unit and weigh the wet filtered solids. Dry the weighed bulk filtered solids at 105° C. to constant weight to determine moisture content and record. This second stage hot leached sample should be labelled appropriately.

k) Take a labelled subsample of not more than 15 g of these dried filtered solids and arrange for analysis of the dried material by XRF for Total S, MgO, CaO, $Na_2O$, $K_2O$, $SiO_2$, $SrO_2$, $Al_2O_3$, $Fe_2O_3$, $Mn_3O_4$, $TiO_2$, NiO, $P_2O_5$, $SO_3$, Cl, TIC, TOC, LOI (NB: Total S is to be determined by a Leco combustion method using calcined (post-LOI)).

l) Send the remainder of the labelled, dried filtered solids to the associate consultant for calcining and pyrometallurgical testing of magnesium production efficiency.

On the basis of numerous laboratory bench trials it can be expected that process variants of the types described above would produce, with an average efficiency of de-sulfation and de-ferration unit processes and intermediate washes, a beneficiated ash product which contains <0.5% sulfur expressed as S on a calcined basis and <8.0% iron expressed as $Fe_2O_3$ on a calcined basis from an initial raw ash which exhibited a total sulfur content of 9.4% on a calcined basis and 11.4% iron content as $Fe_2O_3$ on a calcined basis. These latter sulfur and iron contents are equivalent to contents for sulfur as S after removal of solubles (i.e. NaCl and $Na_2SO_4$) and 50% of the silica content by wet sieving of 14.0% as S and 17.0% iron as $Fe_2O_3$. Therefore they actually mass reductions in sulfur and iron contents of >96.4% and >53% respectively. Calcining and retorting trials indicate it can be expected that the process variants of the two types described above would produce a beneficiated product which, when subject to calcining and then retorting in the presence of appropriate additions of FeSi and lime (CaO) in a Pidgeon Process would yield magnesium (Mg) at recoveries 70-75% of that which can be expected with a high purity dolime feed material.

It can also be expected that the process variants of the two types described above would, with optimal efficiency of de-sulfation and de-ferration unit processes and the intermediate washes, produce a beneficiated product which contains <0.2% sulfur expressed as S on a calcined basis and <4.0% iron expressed as $Fe_2O_3$ on a calcined basis which, when subject to calcining and then retorting in the presence of appropriate additions of FeSi and lime CaO in a Pidgeon Process would yield Mg at recoveries 75-80% of that which can be expected with a high purity dolime feed material.

It can also be expected, on the basis of testing, that the process variants of the two types described above would produce a beneficiated material which, when subject to firstly calcining and then retorting in the presence of appropriate additions of finely ground elemental aluminium only in an alternative reductive pyrometallurgical process would yield Mg at recoveries >90% of that which can be expected with high purity dolime in a Pidgeon Process.

In each case the purity of the produced Mg would be in excess of 99% and any impurities would be largely only fine dust carried through into the crown with the gas stream.

Figure 1:
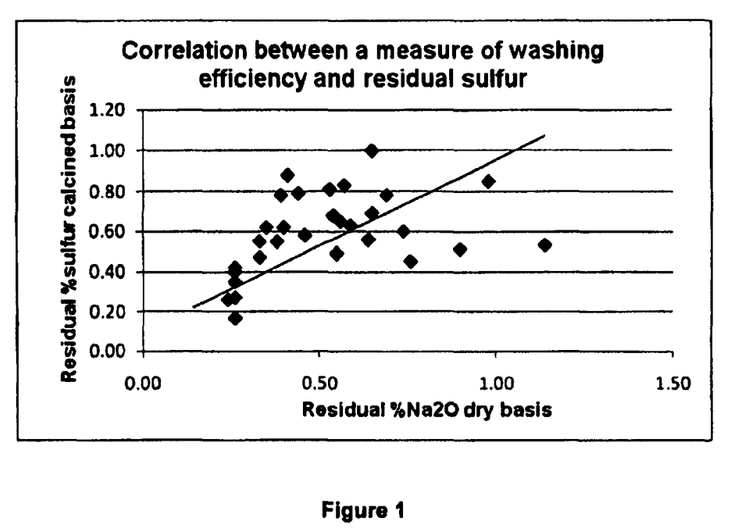
FIG. 1 shows the results of residual sulfur levels attained in some 30 laboratory bench trials.

FIG. 1 shows the results of residual sulfur levels attained in some 30 laboratory bench trials show that one of the major determinants in achieving low residual sulfur levels in the beneficiated product was the efficiency of final washing, as indicated by the residual % Na2O (sodium) level of the beneficiated product.

Figure 2:
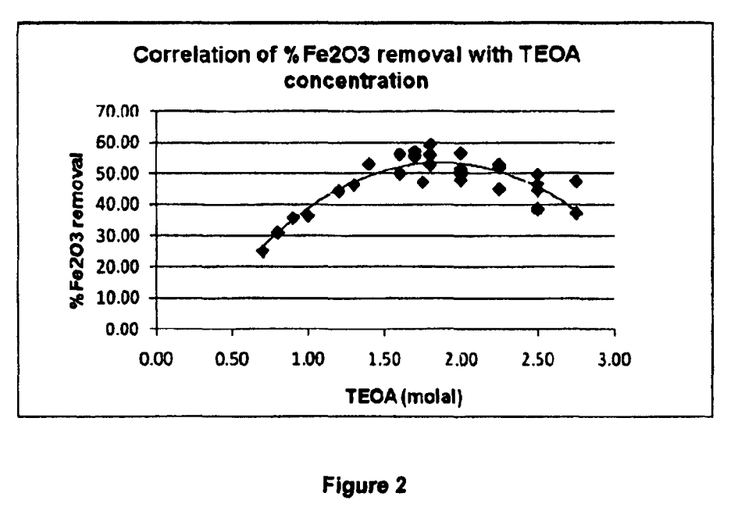
FIG. 2 of residual iron levels as $Fe_2O_3$ attained in some 30 laboratory bench trials.

FIG. 2 of residual iron levels as $Fe_2O_3$ attained in some 30 laboratory bench trials show that one of the major determinations in achieving low residual iron levels in the beneficiated product was the concentration of TEOA in the chemical leach part of the de-ferration with the efficiency passing through a maximum at about 1.8-2.0 molal TEOA. It is noted the degrees of iron removal (as $Fe_2O_3$ on a calcined basis) shown therein were achieved without any prior density-based separation of bulk iron minerals.

Bench Trial Examples

The following briefly describes the procedures and outcomes of two out of seventy laboratory bench trials conducted during development of this process.

Trial T46 was conducted reacting a 10% slurry of 250 grams of raw fly ash with 0.36 molar sodium bicarbonate ($NaHCO_3$) equivalent to 0.18 molar soda ash ($Na_2CO_3$) and only 0.18 molar carbon dioxide at 60° C. for only 6 hours. In all other respects the remaining procedures were as described for Process Set #2 above except that the de-ferration stage was conducted, like Process Set #1 using caustic soda (NaOH) as the alkali in the de-ferration stage. The residual sulfur achieved in the beneficiated material was 0.40% as S on a calcined basis and the residual iron achieved was 8.00% as Fe2O3 on a calcined basis.

Trial T56 was conducted by reacting a 10% slurry of 250 grams of raw fly ash with 0.28 molar sodium bicarbonate ($NaHCO_3$) equivalent to 0.14 moiar soda ash ($Na_2CO_3$) and only 0.14 molar carbon dioxide at ambient temperature for only 6 hours. In all other respects the remaining procedures were as described for Process Set #2 above except that the de-ferration stage was conducted, like Process Set #1 using caustic soda (NaOH) as the alkali in the de-ferration stage. The residual sulfur achieved in the beneficiated material was 0.55% as S on a calcined basis and the residual iron achieved was 8.00% as $Fe_2O_3$ on a calcined basis.

Even though it was subsequently determined in further trials that even lower residual sulfur levels could be achieved by increased carbon dioxide dosage at the de-sulfation stage the beneficiated materials from trials T46 and T56 were processed through the calcining and retorting stages of a miniature scale Pidgeon Process to produce Mg recoveries within the range of 70-75% of that which could be expected with a high purity dolime feed material.

Commercial Process

A hydrometallurgical process involved in the conditioning or beneficiation of a fly ash from a brown coal burning power stations using the process according to the present invention would be implemented as described as follows.

Either a raw dry fly ash or an aged fly ash emplaced in a wet or dry emplacement (commonly call 'ash dams') is prepared as a 1-20% w/v slurry using a highly alkaline waste water from an ash dam. The slurry is passed through a sequential screening process at 0.5 mm and 0.5 mm screen openings with the oversize material rejected to waste and returned to an ash dam.

The slurry is then directed to a 1000 m$^3$ stirred enclosed Reactor Vessel where it is dosed with a (concentrated) soda ash solution prepared in a separate dissolver tank and be sparged with warm, carbon dioxide to a slight overpressure (relative to atmospheric). The carbon dioxide may be previously scrubbed with water to remove SOx and NOx if necessary.

Retention time in this initial de-ferration reactor vessel would be typically maintained at 4-6 hours.

The Reactor Vessel is fitted with Temperature, pH and EC monitoring probes reporting via Programmable Logic Controllers (PLCs) to a whole-of-plant operating system e.g. SCADA. All subsequent storages and reaction vessels in the overall process would also be monitored and operated similarly.

The contents of the reactor vessel would be periodically discharged on a batch basis via holding tanks to an Ash Thickener. Overflow from the Thickener would be passed to a Thickener Overflow beneficiation circuit which would typically bleed 20% to waste (to remove sulfate) and return the remainder to an ash dam and/or to the soda ash makeup circuit.

The thickened, partly de-sulfated slurry is directed to a Feed Tank and thence to a Two Stage in Series Hydrocyclone Circuit which would raise the slurry strength to at least 10% solids, possibly to 20% solids.

It is noted that at this point in the process where a Mozley MGS hydroclone unit could be included to obtain rejection of iron-containing minerals of specific gravity in excess of about 3.2.

The higher density slurry from the hydrocyclones would then be directed into a series of parallel, heated, stirred Hot Leach tanks where it is dosed with additional soda ash solution and held for a Retention Time of about 4 hours at 75° C.

The de-sulfated solids slurry is then be directed to a large Bet Filter unit where it would be dewatered (and rinsed) at a rate of about 400 kg/m$^3$h.

The dewatered material is discharged to a re-slurry Mixer Tank where it would be slurried with water and TEOA (and possible also EG) to an approximate 10% solids strength and then dosed with concentrated sodium hydroxide or aqueous ammonia to a target pH.

From the Mixer Tank the conditioned slurry would pass into a parallel series of stirred, heated hot leaching tanks where it would be held, with stirring; at 75° C. for a period of at least 24 hours.

The chemically de-ferrated solids slurry would then be directed to a large Belt Filter unit where it would be dewatered at a rate of about 400 kg/m$^3$h, with the bulk spent leach liquor being returned to a TEOA Liquor Tank for partial recycling and partial regeneration of TEOA (and EG).

The filter cake on the Belt Filter would subjected to a series of 3 hot water counter current washes. Wash waters would be passed to a 100 m$^3$ Iron Precipitator reaction tank (about 100 m3 capacity) for TEOA (and EG) recovery.

The dewatered and rinsed solids from the Belt Filter would be discharged to a Cake Conveyor and thence to a Cake Bunker for storage and subsequent delivery to the calcining area of the Pidgeon Process plant (or analogous process plant).

In the Iron Precipitator spent iron leach liquor and wash water would be subjected to sparging and reaction with hot carbon dioxide-rich off gases (to a slight over pressure) from the calciners of the Pidgeon Process plant (or analogous process plant) to precipitate sodium, iron, aluminium and silica-rich solids and to evaporate bulk water.

The Iron Precipitator Tank may be heated with a steam jacket and/or that it may be combined in series with a second hot reactor/evaporator tank to enhance bulk water removal. It is noted that both TEOA and EG have boiling points in excess of 185° C. so evaporation may be affected at temperatures significantly in excess of 100° C. e.g. using superheated steam injection.

The commercial process can be carried out in batches and can be scaled up as required by using larger reaction vessels or employing a plurality of reaction vessels at the various process stages (de-sulfation and de-ferration).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A process for conditioning material for pyrometallurgical conversion to magnesium, the process comprising:
   carrying out de-sulfation of the material in a slurry to reduce sulfur content of the material using a carbonation agent; and
   carrying out de-ferration of the de-sulfated material in a slurry to reduce iron content of the material to produce a conditioned material suitable for pyrometallurgical conversion to magnesium.

2. The process according to claim 1 wherein the material is selected from the group consisting of ash derived from brown coal or lignite being in the form of raw dry fly ash, dry emplaced ash, stored dry ash, aged dry ash, wet emplaced ash, stored wet ash, aged wet ash, raw dry, aged dry, wet slags derived from metallurgical production of iron, steel or other ferrous metals, blast furnace slags, blast furnace dusts, basic oxygen furnace slags, basic oxygen furnace dusts, electric arc furnace slags, electric arc furnace dusts, electric arc furnace sludges, dolomite, dolime, limestone, material having a realizable MgO and CaO content, and mixtures thereof.

3. The process according to claim 2 wherein the material is a fly ash from a brown coal power station.

4. The process according to claim 1 wherein the slurry is up to about 30% (w/v) material in water.

5. The process according to claim 4 wherein the slurry is from 1% (w/v) to 20% (w/v) material in water.

6. The process according to claim 1 wherein the carbonation agent is a combination of a strong alkali and carbon dioxide.

7. The process according to claim 6 wherein the strong alkali is seleced from the group consisting of caustic soda (NaOH), caustic potash (KOH), soda ash ($Na_2CO_3$), potash ($K_2CO_3$), ammonia ($NH_4OH$), and a combination thereof.

8. The process according to claim 7 wherein the strong alkali is soda ash.

9. The process according to claim 1 wherein de-sulfation is carried at an elevated temperature up to about 100° C.

10. The process according to claim 9 wherein the elevated temperature is 60° C. to 100° C.

11. The process according to claim 1 wherein de-ferration involves physical separation of bulk iron-containing minerals on the basis of density or magnetic susceptibility.

12. The process according to claim 11 wherein the physical separation is based on a density separation using a cyclone multi-gravity separator.

13. The process according to claim 1 wherein de-ferration further involves use of a complexing agent.

14. The process according to claim 13 wherein the complexing agent is an alkanolamine.

15. The process according to claim 14 wherein the complexing agent is used at a concentration of 1.0 molar to 3.0 molar.

16. The process according to claim 14 wherein the alkanolamine is selected from triethanolamine ($C_6H_{15}NO_3$), mono-ethanolamine ($C_2H_7NO$), diethanolamine ($C_4H_{11}NO_2$), methyldiethanolamine ($C_5H_{13}NO_2$), tri-isopropanolamine ($C_9H_{21}NO_3$), and combination thereof.

17. The process according to claim 16 wherein the complexing agent is triethanolamine or tri-isopropanolamine.

18. The process according to claim 13 wherein the complexing agent is regenerated for reuse in the process.

19. The process according to claim 18 wherein the complexing agent is regenerated by neutralization with carbon dioxide or hydrochloric acid and subsequent evaporation of bulk water to separate waste solids from the complexing agent.

20. The process according to claim 18 wherein the complexing agent is regenerated for reuse by simultaneous neutralization and evaporation of bulk water by treating spent de-ferration leach liquor with a hot source of carbon dioxide.

21. The process according to claim 1 further including a secondary organic complexing agent.

22. The process according to claim 21 wherein the secondary organic complexing agent is selected from common glycols or common polyols.

23. The process according to claim 22 wherein the secondary organic complexing agent is used at a concentration of up to about 3.0 molar.

24. The process according to claim 22 wherein the common glycols are selected from ethylene glycol, propylene glycol, 1,3-propanediol and 1,3-butanediol ($C_4H_{10}O_2$), and the common polyols are selected from threitol, mannitol, sorbitol and xylitol.

25. The process according to claim 24 wherein the organic complexing agent is ethylene glycol.

26. The process according to claim 1 wherein de-ferration is carried at an elevated temperature.

27. The process according to claim 26 wherein the elevated temperature is up to about 100° C.

28. The process according to claim 27 wherein the elevated temperature is about 75° C.

29. The process according to claim 1 wherein the sulfur content of the material is reduced to less than about 0.5% mass on a calcined basis.

30. The process according to claim 29 wherein the sulfur content of the material is reduced to about 0.2% mass on a calcined basis.

31. The process according to claim 1 wherein the iron content of the material is reduced to less than about 8% mass on a calcined basis.

32. The process according to claim 31 wherein the iron content of the material is reduced to about 4% mass on a calcined basis.

33. The process according to claim 1 further comprising carrying out a reductive pyrometallurgical process on the conditioned material to obtain magnesium metal.

34. The process according to claim 33 wherein the pyrometallurgical process comprises a batch-wise thermal reduction process using ferrosilicon to reduce the magnesium from Dolime.

35. A process for conditioning fly ash from a brown coal power station for pyrometallurgical conversion to magnesium, the process comprising:
    carrying out de-sulfation of the fly ash in a slurry to reduce sulfur content of the fly ash using a carbonation agent being a combination of a strong alkali and carbon dioxide; and
    carrying out de-ferration of the de-sulfated fly ash in a slurry to reduce iron content of the de-sulfated fly ash to produce a conditioned material suitable for pyrometallurgical conversion to magnesium, wherein the de-ferration involves use of a complexing agent being alkanolamine.

36. The process according to claim 35 wherein the strong alkali is soda ash.

37. The process according to claim 35 wherein the alkanolamine is triethanolamine or tri-isopropanolamine.

38. The process according to claim 35 further comprising carrying out a reductive pyrometallurgical process on the conditioned material to obtain magnesium metal.

* * * * *